No. 802,460. PATENTED OCT. 24, 1905.
A. MARSHALL.
FLOWER POT.
APPLICATION FILED JUNE 6, 1905.
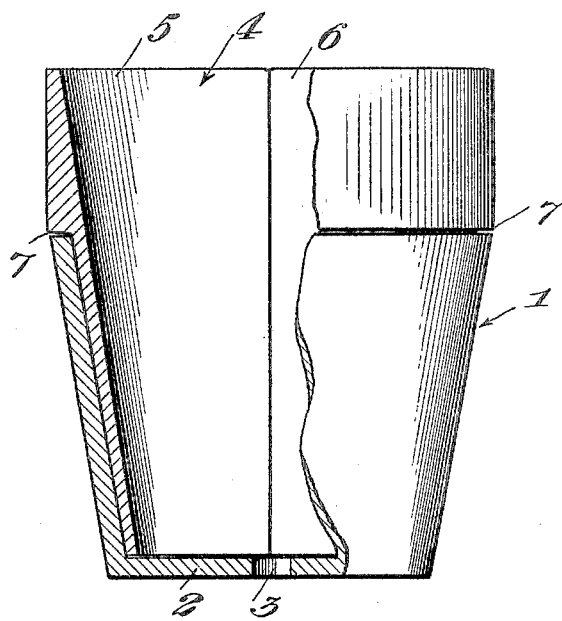
Witnesses
Edmund A. Strauss
Myrtle A. Jones
Inventor
Alexander Marshall
by Hazard & Harpham
Attorneys.

UNITED STATES PATENT OFFICE.

ALEXANDER MARSHALL, OF LOS ANGELES, CALIFORNIA.

FLOWER-POT.

No. 802,460. Specification of Letters Patent. Patented Oct. 24, 1905.

Application filed June 6, 1905. Serial No. 264,017.

*To all whom it may concern:*

Be it known that I, ALEXANDER MARSHALL, a citizen of Great Britain, residing at Los Angeles, in the county of Los Angeles and State of California, have invented new and useful Improvements in Flower-Pots, of which the following is a specification.

This invention has for its object to provide a flower-pot of simple and cheap construction by which plants may be readily transferred from one pot to another or from the pot to the garden without danger to the roots or disturbing the earth. I accomplish this object by the pot described herein and illustrated in the accompanying drawing, in which the figure is a side elevation, partially in central vertical section, of my improved flower-pot.

In the drawing, 1 is the outer conical-shaped member formed in the usual manner, but preferably of less height, having a bottom 2 with the usual water-outlet 3. Fitting within this outer member is an inner member 4, longitudinally divided, preferably into two parts 5 and 6, the lower portions of which form a lining for the side walls of the outer member. These inner members preferably project above the outer members and are provided with annular shoulders 7, which rest on the rim of the outer member. These inner members when placed within the outer member form a flower-pot of the usual dimensions and appearance. By this construction a removable lining is provided for a flower-pot which enables the removal of the plant without disturbing the roots or the soil around them, and the lining members can be detached from the earth surrounding the roots when the plant is in its new position without breaking the soil.

Having described my invention, what I claim as new, and desire to secure by Letters Patent, is—

1. A conical-shaped flower-pot having a separable longitudinally-divided lining for the sides thereof; and an outer conical-shaped non-separable body extending a sufficient distance to support and hold the lining in place.

2. A flower-pot consisting of conical outer and inner members, the outer member having a bottom at its smaller end, the inner member adapted to fit within the outer member and form a lining for the side walls thereof, said inner member being open at the top and bottom thereof and being longitudinally divided, said outer member being non-separable and extending a sufficient distance to support and hold the inner member in place.

3. A flower-pot consisting of conical outer and inner members, the outer member having a bottom at its smaller end, the inner member being separably longitudinally divided and having annular shoulders which are adapted to rest on the rim of the outer member when said inner members are inserted within the outer member.

In witness that I claim the foregoing I have hereunto subscribed my name this 31st day of May, 1905.

ALEXANDER MARSHALL.

Witnesses:
HENRY T. HAZARD,
G. E. HARPHAM.